3,020,261
POLYNITRO URETHANES

Lloyd H. Brown, Glendora, Calif., assignor to Aerojet-General Corporation, Azusa, Calif., a corporation of Ohio
No Drawing. Filed Aug. 9, 1954, Ser. No. 448,737
6 Claims. (Cl. 260—47)

This invention relates to high molecular weight polyurethanes containing nitro groups.

It is the object of this invention to prepare high molecular weight compounds useful as solid smokeless propellants.

The polyurethanes of my invention possess numerous advantages over the composite and double-base solid propellants commonly in use today. In the propellant substances of my invention, the oxidizer is an integrated part of the chemical compound, thereby enhancing the reproducibility of ballistic properties and eliminating dangerous and costly grinding and mixing operations. In propellant compositions commonly in use at present, the oxidizing element is usually present in the form of a metal salt which is dispersed in some type of binder, usually an alkyd resin. Numerous problems are involved in the preparation of this type of propellant, namely, obtaining uniform dispersion of the oxidizing agent throughout the binding composition and at the same time preventing the formation of cracks and faults in the propellant grain itself.

The polyurethanes of my invention, having no metals whatsoever present, are smokeless, and since all of the elements of the propellant are integrated in the molecular chain itself, there are no difficulties encountered in dispersing the oxidizing component nor is it necessary to perform any difficult and dangerous grinding and mixing operations.

The high specific impulse and high density of the polyurethane compositions of this invention render them extremely valuable wherever weight and size considerations of the propellant charge are important.

In addition to these valuable propellant properties, it has also been found that these materials possess high temperature and impact stability, thereby rendering their production both safe and economical.

The polyurethanes of my invention may be conveniently prepared by simply reacting an alkylene diisocyanate with a nitro substituted aromatic diol, in accordance with the general reaction scheme set forth below:

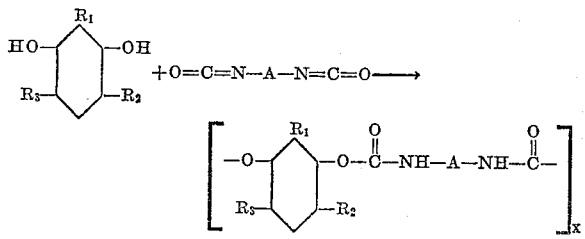

wherein A is an alkylene radical, $R_1$, $R_2$, and $R_3$ are radicals selected from the group consisting of hydrogen and nitro radicals, at least one R being nitro, and $x$ is a whole number.

It has been found that in order to shorten the reaction time and to obtain high molecular weight polymers, that is, polyurethanes having molecular weights of the order of about 75,000, it is desirable to conduct the reaction in the presence of a suitable catalyst. Several catalysts have been found to be useful and among these are: boron trifluoride, boron trifluoride complexes such as boron trifluoride·etherate, and metal chelates such as ferric acetylacetonate.

It is evident from the reaction scheme set forth above that a wide variety of polyurethanes can be prepared in this manner, simply by varying the particular alcohol and diisocyanate used in the reaction. Among the alcohols found to be useful in preparing the polyurethanes of this invention are: 1,3-dihydroxy-2-nitrobenzene, 1,3-dihydroxy-2,4-dinitrobenzene, and 1,3-dihydroxy-2,4,6-trinitrobenzene (styphnic acid). Among the diisocyanates found to be useful are: methylene diisocyanates, ethylene diisocyanates, 1,2-propylene diisocyanates, and various higher homologues of these alkylene diisocyanates.

The following example is provided to more clearly illustrate my invention.

Preparation of:

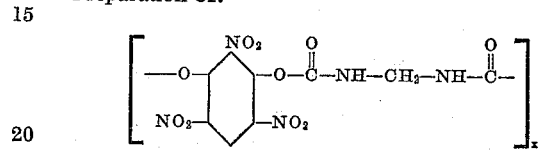

wherein $x$ is a whole number greater than one.

20 gm. of methylene diisocyanate and 50 gm. of styphnic acid were placed in a large test tube fitted with a reflux condenser. The mixture was diluted with 50 ml. of anhydrous dioxan and allowed to stand in a water bath at room temperature. The reaction began immediately and the viscosity of the solution increased rapidly. After the reaction proceeded for one hour, the newly formed resin developed a hard gloss even though diluted with dioxan. The bath temperature was then raised to 80° C. for a period of 30 minutes and the mixture allowed to cool slowly overnight. The resulting yellow resin was separated by filtration, washed with dioxan, carbon tetrachloride, and finally chloroform.

After air drying the resulting product was weighed and found to be 50 gm. The product melted at 160° to 165° C. The resin was thoroughly extracted with hot absolute methanol, filtered, washed with ether, and dried. The resin showed a softening between 180° and 189° C. and decomposed at 190° to 195° C. Analysis of the product compared to its calculated value is as follows. Calculated for $C_9H_5N_5O_{10}$: percent N, 20.40. Found: percent N, 22.02.

The diisocyanates utilized in the preparation of the polyurethanes of this invention may be conveniently prepared by conventional methods.

I claim:

1. As new compositions of matter, the polynitro urethanes having the general formula:

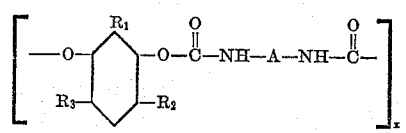

wherein $R_1$, $R_2$, and $R_3$ are radicals selected from the group consisting of hydrogen and nitro radicals, at least one R being nitro, A is a lower alkylene radical, and $x$ is a whole number greater than one.

2. As new compositions of matter, the polynitro urethanes having the general formula:

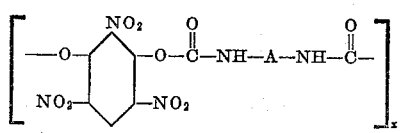

wherein A is a lower alkylene radical and $x$ is a whole number greater than one.

3. As new compositions of matter, the polynitro urethanes having the general formula:

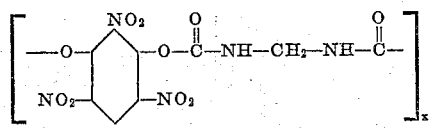

wherein $x$ is a whole number greater than one.

4. The method of preparing polynitro urethanes having the general formula:

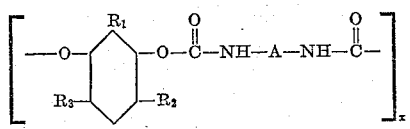

which comprises condensing an aromatic compound having the general formula:

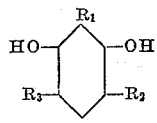

with an alkylene diisocyanate having the general formula:

$$O=C=N-A-N=C=O$$

wherein $R_1$, $R_2$, and $R_3$ are radicals selected from the group consisting of hydrogen and nitro radicals, at least one R being nitro, A is a lower alkylene radical, and $x$ is a whole number greater than one.

5. The method of preparing polynitro urethanes having the general formula:

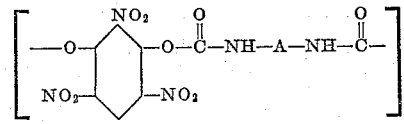

which comprises condensing styphnic acid and an alkylene diisocyanate having the general formula:

$$O=C=N-A-N=C=O$$

wherein A is a lower alkylene radical and $x$ is a whole number greater than one.

6. The method of preparing polynitro urethanes having the general formula:

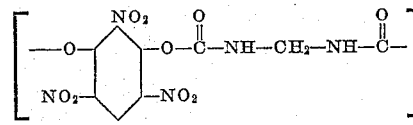

wherein $x$ is a whole number greater than one, which comprises condensing styphnic acid and methylene diisocyanate.

No references cited.